US 8,896,737 B2
Nov. 25, 2014

(12) United States Patent
Sugiyama et al.

(54) IMAGING APPARATUS WITH ELEMENT THAT SELECTIVELY TRANSFERS CHARGE ACCUMULATED IN FIRST SEMICONDUCTOR REGION OF ACCUMULATING ELEMENT TO FLOATING DIFFUSION REGION AND METHOD

(71) Applicant: Canon Kabushiki Kaisha, Tokyo (JP)

(72) Inventors: Shuichiro Sugiyama, Kobe (JP); Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/942,254

(22) Filed: Jul. 15, 2013

(65) Prior Publication Data

US 2013/0300904 A1    Nov. 14, 2013

Related U.S. Application Data

(62) Division of application No. 12/637,816, filed on Dec. 15, 2009, now Pat. No. 8,564,706.

(30) Foreign Application Priority Data

Dec. 26, 2008  (JP) ................. 2008-334917

(51) Int. Cl.
| | |
|---|---|
| H04N 3/14 | (2006.01) |
| H04N 5/335 | (2011.01) |
| H04N 5/202 | (2006.01) |
| H04N 5/359 | (2011.01) |
| H04N 5/374 | (2011.01) |
| H04N 5/361 | (2011.01) |

(52) U.S. Cl.
CPC .......... *H04N 5/335* (2013.01); *H04N 5/3597* (2013.01); *H04N 5/3741* (2013.01); *H04N 5/361* (2013.01)
USPC ..................... 348/311; 348/308; 348/254

(58) Field of Classification Search
USPC .................................. 348/308, 311, 254
See application file for complete search history.

(56) References Cited

U.S. PATENT DOCUMENTS

| 7,623,056 B2 | 11/2009 | Yamashita | 341/163 |
| 7,633,539 B2 | 12/2009 | Yamashita | 348/294 |

(Continued)

FOREIGN PATENT DOCUMENTS

| JP | 8122149 A | 5/1996 |
| JP | 2004-111590 A | 4/2004 |

(Continued)

OTHER PUBLICATIONS

B.E. Burke et al. Dynamic Suppression of Interface-State Dark Current in Buried-Channel CCD's, IEEE Transactions on Electron Devices, vol. 38, No. 2, Feb. 1991, pp. 285-290.

(Continued)

*Primary Examiner* — Joel Fosselman
(74) *Attorney, Agent, or Firm* — Fitzpatrick, Cella, Harper & Scinto

(57) ABSTRACT

A solid-state imaging apparatus has a plurality of pixels, wherein each of the pixels includes: a photoelectric conversion element for converting incident light to an electric charge; an accumulating element accumulating the electric charge converted by the photoelectric conversion element; a first transfer element for transferring the electric charge converted by the photoelectric conversion element to the accumulating element; a second transfer element for transferring the electric charge accumulated in the accumulating element to a floating diffusion region; and an amplifying element for amplifying the electric charge in the floating diffusion region, wherein the first transfer element transfers the electric charge converted by the photoelectric conversion element to the accumulating element a plurality of times and causes the accumulating element to cumulatively accumulate the electric charge transferred the plurality of times.

9 Claims, 8 Drawing Sheets

(56) References Cited

U.S. PATENT DOCUMENTS

| | | | |
|---|---|---|---|
| 8,094,225 B2 | 1/2012 | Yamashita | 348/302 |
| 2004/0051801 A1 | 3/2004 | Lizuka et al. | 348/294 |
| 2005/0083421 A1* | 4/2005 | Berezin et al. | 348/308 |
| 2008/0024636 A1* | 1/2008 | Oda | 348/308 |
| 2008/0036890 A1 | 2/2008 | Yamashita et al. | 348/308 |
| 2009/0244328 A1 | 10/2009 | Yamashita | 348/241 |
| 2009/0256176 A1 | 10/2009 | Kobayashi et al. | 257/225 |
| 2009/0284632 A1 | 11/2009 | Onuki et al. | 348/302 |
| 2009/0321799 A1 | 12/2009 | Velichko et al. | 257/292 |
| 2010/0200738 A1 | 8/2010 | Yamashita | 250/227.11 |
| 2011/0205416 A1 | 8/2011 | Nishihara | 348/300 |

FOREIGN PATENT DOCUMENTS

| | | |
|---|---|---|
| JP | 2005-101864 | 4/2005 |
| JP | 2006-246450 A | 9/2006 |
| JP | 2010-136281 A | 6/2010 |

OTHER PUBLICATIONS

Japanese Official Letter dated Oct. 16, 2012, issued in related Japanese Patent Application No. 2008-334917 and partial English translation.

* cited by examiner

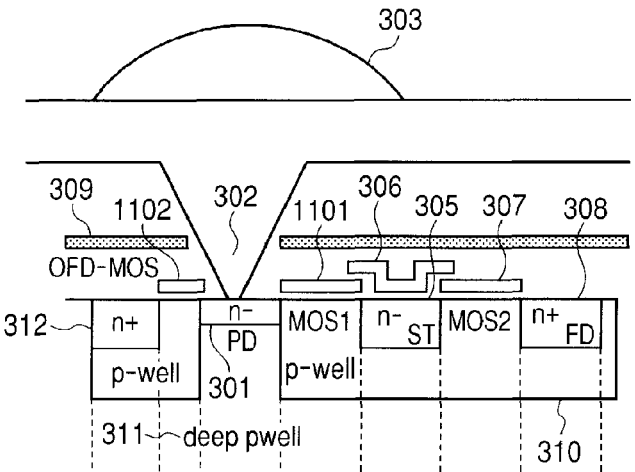
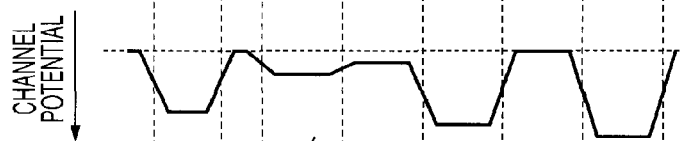
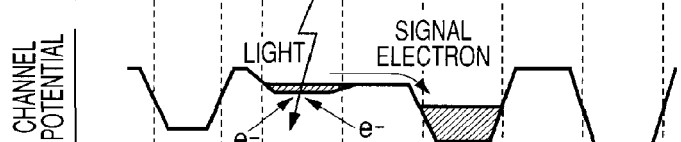
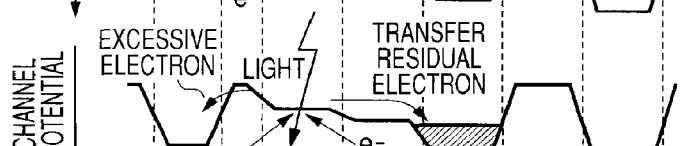
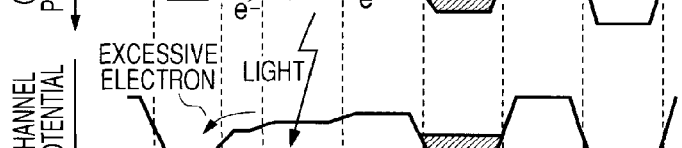
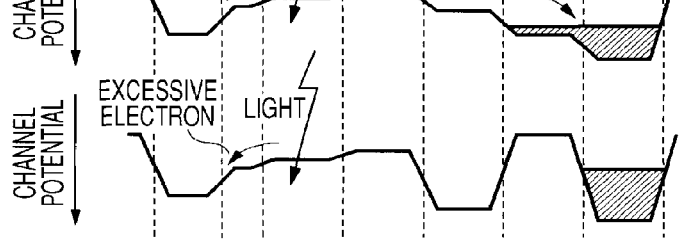
PRIOR ART

IMAGING APPARATUS WITH ELEMENT THAT SELECTIVELY TRANSFERS CHARGE ACCUMULATED IN FIRST SEMICONDUCTOR REGION OF ACCUMULATING ELEMENT TO FLOATING DIFFUSION REGION AND METHOD

CROSS REFERENCE TO RELATED APPLICATIONS

This application is a division of U.S. application Ser. No. 12/637,816, filed Dec. 15, 2009, the entire disclosure of which is hereby incorporated herein by reference.

BACKGROUND OF THE INVENTION

1. Field of the Invention

The present invention relates to a solid-state imaging apparatus, a driving method of the same and an imaging system for use in a scanner, a video camera, a digital still camera and the like.

2. Related Background Art

In a conventional solid-state imaging apparatus, there has been generally known a pixel configured such that a photoelectric conversion element performing photoelectric conversion on incident light also serves as an accumulating element for accumulating an electric charge.

In contrast to this, Japanese Patent Application Laid-Open No. 2004-111590 (hereinafter referred to simply as Patent Document 1) discloses a technique for providing the accumulating element separately from the photoelectric conversion element. According to Patent Document 1, a global shutter can be implemented by transferring the electric charge accumulated in the photoelectric conversion element from the photoelectric conversion element to the accumulating element for all the pixels at the same time.

Alternatively, Japanese Patent Application Laid-Open No. 2006-246450 (hereinafter referred to simply as Patent Document 2) discloses a configuration in which the accumulating element is provided separately from the photoelectric conversion element and most of the electric charges generated by the photoelectric conversion element is not accumulated in the photoelectric conversion element but is transferred to an electric charge accumulating region. FIGS. 9A to 9G are reproduced from FIG. 6 of Patent Document 2. An N-type photodiode layer 301 in FIGS. 9A to 9G forms a PN junction with a P-type silicon substrate. A light guide 302 located above the photodiode has a higher dielectric constant than that of its surrounding region and collects incident light. A surface micro-lens 303 guides light entered through the surface to the light guide 302. An N-type electric charge accumulating layer 305 accumulates the electric charge generated in the photodiode. A holding electrode 306 maintains the surface of the electric charge accumulating layer in a reverse state. A second transfer electrode 307 receives a pulse for transferring the electric charge accumulated in the electric charge accumulating layer 305. A floating diffusion 308 accumulates the electric charge transferred from the electric charge accumulating layer 305 again and converts the electric charge to a voltage signal. A light shielding film 309 shields the portion other than the photodiode element from light. A P-type well region 310 forms a reverse biased PN junction with the N-type layers such as the electric charge accumulating layer 305 and the floating diffusion 308. A deep P well layer 311 forms a retrograde potential so that the electric charge generated by photoelectric conversion in a deep position inside the silicon is collected in the photodiode element. An N-type overflow drain region 312 serves to discharge the electric charge overflowed from the photodiode to the power source. A first transfer electrode 1101 controls the potential barrier so that the electric charge generated in the photodiode is accumulated in the electric charge accumulating layer 305. An overflow drain control electrode 1102 discharges excess electric charge in the photodiode to a power source when a predetermined potential is applied.

FIGS. 9B to 9G are each an electron potential diagram corresponding to the cross section of FIG. 9A illustrating the electric charge generated in the photodiode until being transferred to the floating diffusion. FIG. 9B is an electron potential diagram before light is entered. FIG. 9C illustrates a state where light is entered and then the photodiode performs photoelectric conversion on the light to generate electric charge which flows into the electric charge accumulating layer. FIG. 9D illustrates a state where a positive voltage is applied to the first transfer electrode 1101 and the electric charge is completely transferred from the photodiode to the electric charge accumulating layer 305. FIG. 9E illustrates a state where a positive voltage is applied to the overflow drain electrode 1102 to discharge the electric charge entered into the photodiode. FIG. 9F illustrates a state where a positive voltage is applied to the second transfer electrode 307 by an operation of an electronic shutter and the electric charge is being transferred from the electric charge accumulating layer 305 to the floating diffusion 308. Finally, FIG. 9G illustrates a state where the generated electric charge has been completely transferred to the floating diffusion 308.

Note that according to the configuration disclosed in aforementioned Patent Document 2, two methods are disclosed as the method of controlling the potential barrier by the first transfer electrode 1101 located between the photoelectric conversion element and the accumulating element. One method is to use a surface channel MOS transistor to always keep the transistor weakly turned ON during the photoelectric conversion period. The other method is to use a buried channel MOS transistor to provide a low potential position at a certain depth from the surface while keeping the transistor strongly turned OFF during the photoelectric conversion period. According to Patent Document 2, the photoelectric conversion element can be reduced to a minimum size required to receive light. This configuration enables an intrasurface synchronized electronic shutter for synchronizing the start time and the end time to accumulate all pixels in the surface.

Alternatively, a document "Dynamics Suppression of Interface-State Dark Current in Buried-Channel CCDs" IEEE Transactions On Electron Devices, VOL. 38, No. 2, February 1991 (hereinafter referred to as Non-Patent Document 1) reveals that an average dark current at the time of transfer can be reduced by shortening a transfer period per transfer in a transfer channel of the buried channel CCD (Charge Coupled Device).

As the method of controlling the potential barrier by the first transfer electrode 1101, consider generating a potential structure as illustrated in FIG. 9B by a method of using a surface channel MOS transistor. In this case, there arises a problem in that dark current increases due to depletion of a substrate surface constituting an MOS transistor of the transfer element. In order to cause electrons to flow from the photoelectric conversion element into the accumulating element, the potential barrier needs to be lowered. In order to do this, the above described MOS transistor needs to be turned ON. At this time, the substrate surface is weakly inverted or strongly inverted, thereby generating electrons which are seen as dark current.

Next, as the method of controlling the potential barrier by the first transfer electrode 1101, consider generating a potential structure as illustrated in FIG. 9B by a method of using a buried channel MOS transistor. In this case, in FIG. 9B, a high channel potential portion appears in a position at a certain depth from the surface. Then, the electric charge generated by photoelectric conversion in the photodiode element is shielded by the potential barrier generated by the MOS transistor. Therefore, some electric charge is accumulated in the photodiode and the overflowed electric charge is sequentially sent to the accumulating element as a signal charge. While electrons are being sent to the accumulating element, a conductive carrier opposite to the signal charge is accumulated in the substrate surface. Thereby, dark current is suppressed from occurring.

However, if photoelectric conversion is performed for a long time in a state where the electric charge is accumulated in the photodiode, the internal electric field of the photodiode continues to be weak during the photoelectric conversion period, thereby increasing the probability that the generated electric charge is escaped from the photodiode to adjacent pixels or the substrate without staying therein. Thus, an increase in the probability that the generated electric charge is not accumulated in the accumulating element but is escaped to other places causes cross talk or color mixture or photo response non-uniformity (PRNU) to increase. Here, cross talk or color mixture means that in a color photoelectric conversion apparatus, the electric charge generated by light entered into a pixel is escaped to adjacent pixels and exhibits a color different from the original color. Photo response non-uniformity (PRNU) means a degree of unevenness of an image formed due to a variation in signal intensity for each pixel caused by a variation in sensitivity of the pixel itself or a variation in gain of the reading system with respect to the same incident light intensity. Both cross talk or color mixture and PRNU are undesirable for the imaging apparatus.

An object of the present invention is to solve the aforementioned problems and to provide a solid-state imaging apparatus, a driving method of the same and an imaging system capable of reducing cross talk or color mixture or photo response non-uniformity (PRNU) by suppressing dark current from occurring.

SUMMARY OF THE INVENTION

A solid-state imaging apparatus of the present invention having a plurality of pixels, wherein each of the pixels comprising: a photoelectric conversion element for converting an incident light into an electric charge; an accumulating element for accumulating the electric charge converted by the photoelectric conversion element; a first transfer element for transferring the electric charge converted by the photoelectric conversion element to the accumulating element; a second transfer element for transferring the electric charge accumulated in the accumulating element to a floating diffusion region; and an amplifying element for amplifying the electric charge in the floating diffusion region, wherein the first transfer element transfers, at a plurality of times, the electric charge converted by the photoelectric conversion element to the accumulating element, and the accumulating element accumulates cumulatively the electric charge transferred at the plurality of times.

Further features of the present invention will become apparent from the following description of exemplary embodiments with reference to the attached drawings.

BRIEF DESCRIPTION OF THE DRAWINGS

FIGS. 9A, 9B, 9C, 9D, 9E, 9F and 9G illustrate a configuration example of a solid-state imaging apparatus.

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
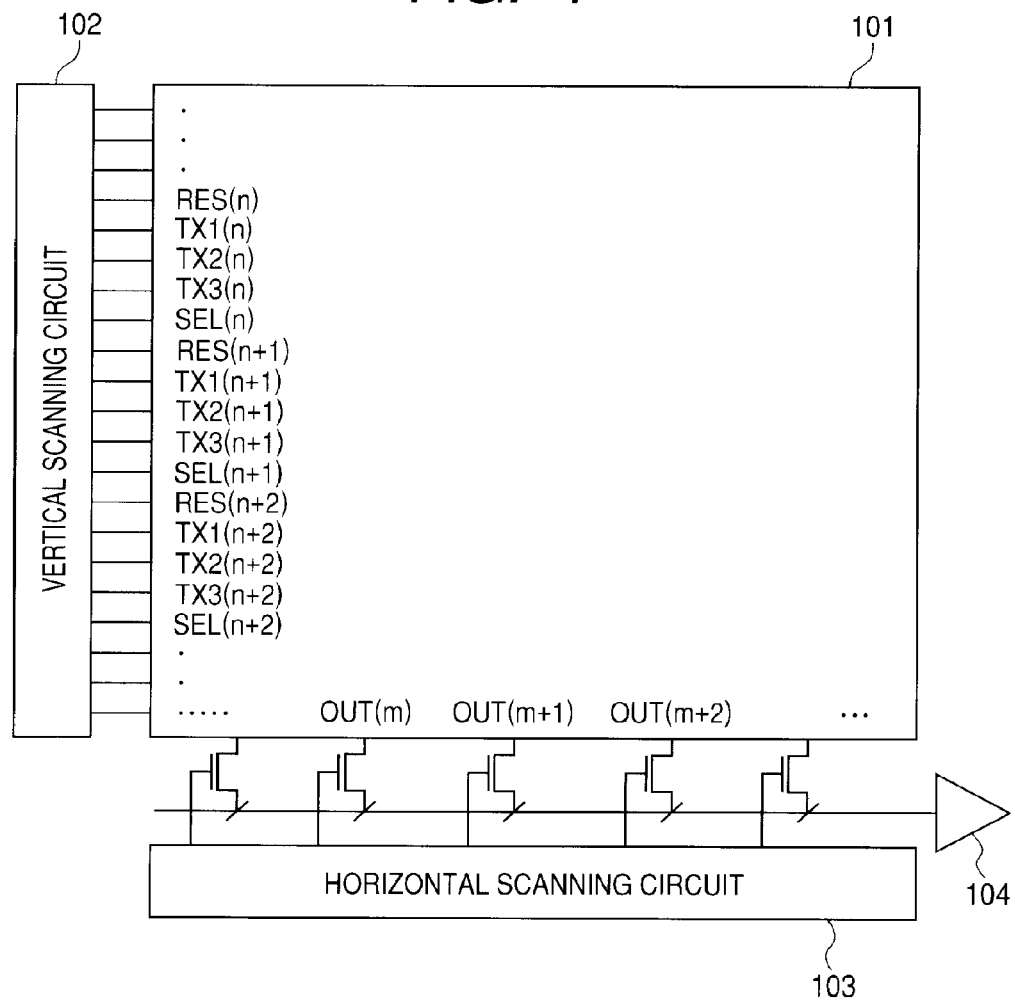
FIG. 1 is a schematic block diagram illustrating a configuration example of a solid-state imaging apparatus according to a first embodiment of the present invention.
Figure 2:
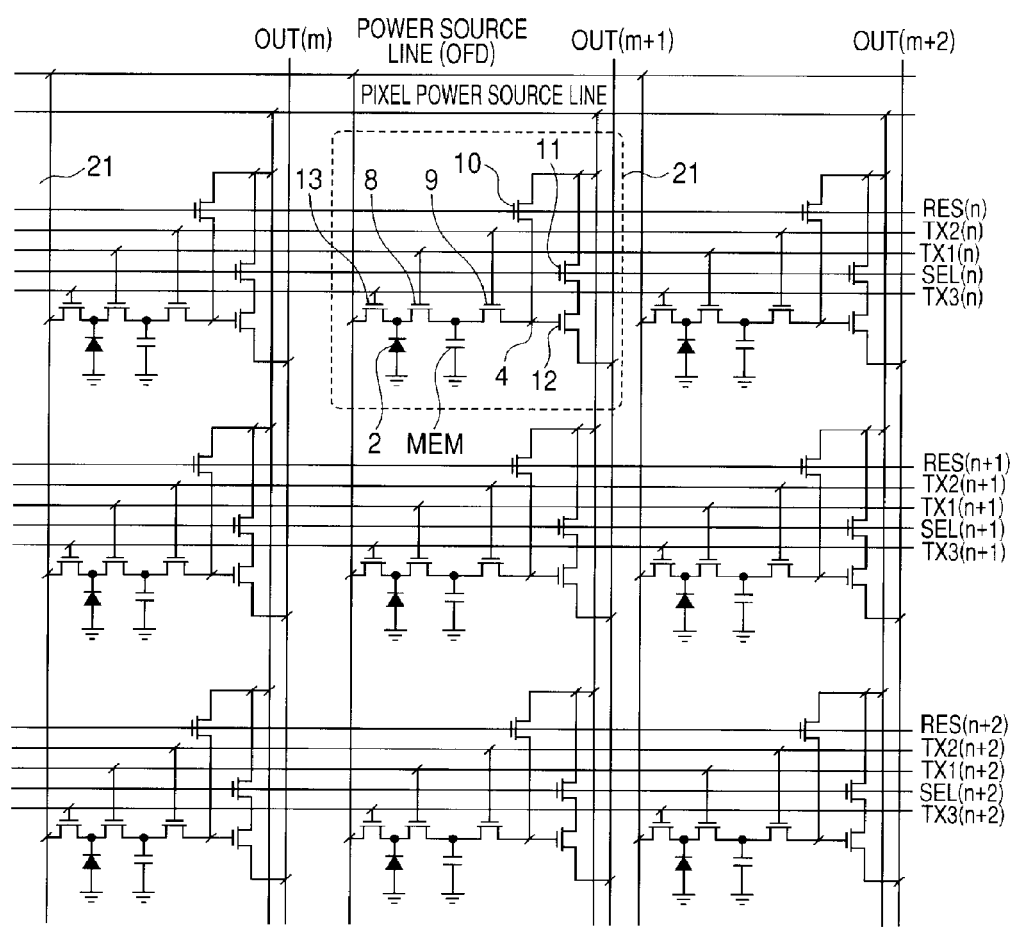
FIG. 2 is an equivalent circuit diagram of a pixel contained in an imaging area.
Figure 3:
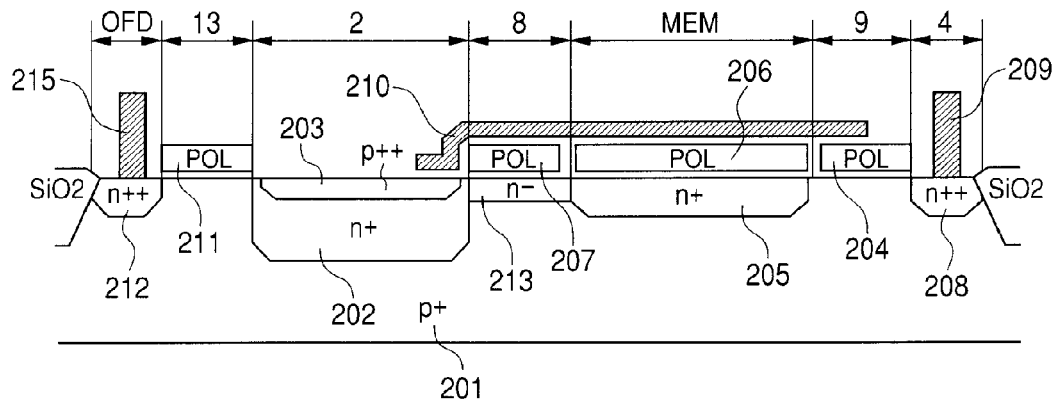
FIG. 3 is a sectional view illustrating a case where a pixel is formed on a semiconductor substrate.
Figure 4:
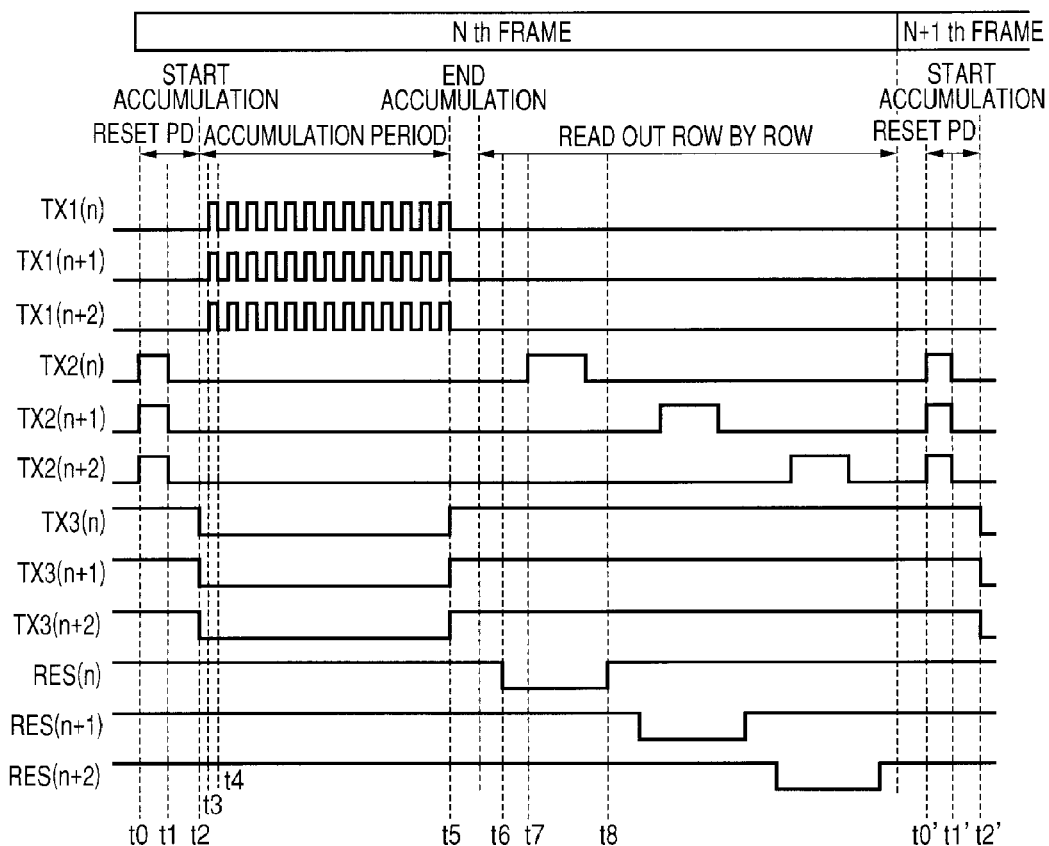
FIG. 4 is a timing chart illustrating a driving method of driving the solid-state imaging apparatus.

FIG. 1 is a schematic block diagram illustrating a configuration example of a solid-state imaging apparatus according to a first embodiment of the present invention. FIG. 2 is an equivalent circuit diagram of a pixel contained in an imaging area 101. FIG. 3 is a sectional view illustrating a case where a pixel illustrated in FIG. 2 is formed on a semiconductor substrate. FIG. 4 is a timing chart illustrating a driving method of driving the solid-state imaging apparatus.

In FIG. 1, the solid-state imaging apparatus includes an imaging area 101 in which a plurality of pixels is provided, a vertical scanning circuit 102 which is a control element and a horizontal scanning circuit 103. Here, the pixels provided in the imaging area 101 are assumed to be arranged in a matrix shape. The horizontal scanning circuit 103 sequentially scans signal lines each corresponding to a pixel column of the imaging area 101 and causes an output circuit 104 to output a signal for each of a row of pixels.

In FIG. 2, for brevity of description, an example is described where the imaging area 101 has a total of 9 pixels (3 lines×3 columns), but the number of pixels is not limited to this number. The pixel 21 includes a photodiode (PD) 2, a floating diffusion region 4, a first transfer switch 8, a second transfer switch 9, a reset transistor 10, a select transistor 11, an amplifying transistor 12, a third transfer switch 13 and a accumulating element MEM.

The photodiode 2 is a photoelectric conversion element which converts incident light to an electric charge. The accumulating element MEM accumulates the electric charge converted by the photodiode 2. The first transfer switch 8 is a first transfer element which transfers the electric charge converted by the photodiode 2 to the accumulating element MEM. The second transfer switch 9 is a second transfer element which transfers the electric charge accumulated in the accumulating element MEM to the floating diffusion region 4. The anode of the photodiode (PD) 2 is grounded at a fixed potential and the cathode thereof is connected to one terminal of the accumulating element MEM via the first transfer element 8. The cathode of the photodiode 2 is further connected to a power source line which is a second power source serving as an overflow drain (hereinafter referred to simply as OFD) via a third transfer switch 13 which is a third transfer element. The other terminal of the accumulating element MEM is grounded at a fixed potential. The one terminal of the accumulating element MEM is further connected to a gate terminal of the amplifying transistor 12 which is an amplifying element via the second transfer element 9. The gate terminal of the amplifying transistor 12 is connected to a pixel power source line via the reset transistor 10 which is a reset element. The example illustrates that the first to third transfer elements 8, 9 and 13 are each configured of a transistor. In FIG. 2, the power source line serving as the OFD is separated from the pixel power source line. These lines may be connected to a common power source or may each be connected to a different power source.

The select transistor 11 is configured such that a drain terminal which is one main electrode thereof is connected to the pixel power source line and a source terminal which is the other main electrode thereof is connected to a drain terminal which is one main electrode of the amplifying transistor 12. When an active signal SEL is input to a control electrode, both main electrodes of the select transistor 11 enters a conductive state.

Thereby, the amplifying transistor 12 forms a source follower circuit together with a constant current source (not illustrated) provided in a vertical signal line OUT and a signal corresponding to a potential of the gate terminal which is a control electrode of the amplifying transistor 12 appears on the vertical signal line OUT. When the signal appears on the vertical signal line OUT, the solid-state imaging apparatus outputs the signal from the output circuit 104 thereof. The signal passes through a signal processing circuit unit described later and then is displayed as an image. Moreover, a floating diffusion region (hereinafter referred to simply as an FD region) 4 which is commonly connected to the gate terminal of the amplifying transistor 12 and the main electrodes of the reset transistor 10 and the second transfer switch 9 has a capacitance value and can hold an electric charge.

In FIG. 3, the same reference numeral or character is assigned to the corresponding component in FIG. 2. The conductive type of a semiconductor region is described by taking an example of using an electron as signal charge. When a hole is used, the conductive type of each semiconductor region may be an inverted conductive type.

A P-type semiconductor region 201 may be formed by implanting a P-type impurity ion into an N-type semiconductor substrate or may be formed by using a P-type semiconductor substrate.

An N-type semiconductor region (first conductive first semiconductor region) 202 constitutes part of the photoelectric conversion element. The N-type semiconductor region 202 has the same polarity as the electron which is signal charge. The N-type semiconductor region 202 forms a PN junction with part of the P-type semiconductor region 201 (second conductive second semiconductor region).

A P-type semiconductor region 203 is provided on a surface of the N-type semiconductor region 202. The P-type semiconductor region 203 is provided so as to make the photoelectric conversion element 2 into a pinned type photodiode. The P-type semiconductor region 203 serves to reduce an effect of the interface state and suppress dark current from occurring on a surface of the photoelectric conversion element. The photoelectric conversion element 2 is configured to include at least the first semiconductor region 202 and the second semiconductor region 201 forming a PN junction with the first semiconductor region 202.

A second transfer electrode 204 constitutes a second transfer switch 9. The voltage supplied to the second transfer electrode 204 can control a potential state between a third semiconductor region 205 constituting part of the accumulating element MEM and an N-type semiconductor region 208 (first conductive fourth semiconductor region) constituting part of the floating diffusion region 4. The second transfer electrode 204 is provided on a second path between a third semiconductor region 205 and a fourth semiconductor region 208 described later via an insulating film.

An N-type semiconductor region (first conductive third semiconductor region) 205 constitutes part of the accumulating element MEM. The N-type semiconductor region 205 is configured to be able to accumulate the electric charge transferred from the photoelectric conversion element 2 for a certain period. A control electrode 206 is provided on the third semiconductor region 205 via an insulating film and can control the potential state of a region near the interface with the insulating film of the third semiconductor region 205. The effect of a dark current occurring near the interface with a surface oxide film of the N-type semiconductor region 205 can be reduced by supplying a voltage to the control electrode 206 during the period while the electric charge is being held in the accumulating element MEM. As described later, the voltage supplied at this time is preferably a negative voltage such as about −3V enough to collect holes in the interface between the third semiconductor region 205 and the insulating film. The voltage is appropriately changed depending on the impurity concentration of the third semiconductor region 205.

The accumulating element MEM is configured to include the N-type semiconductor region 205 and the control electrode 206.

A first transfer electrode 207 constitutes the first transfer switch 8. The first transfer electrode 207 can control the potential state of the first path between the photoelectric conversion element 2 and the accumulating element MEM. An N-type semiconductor region 213 is provided below the first transfer electrode 207 and between the N-type semiconductor region 202 and the N-type semiconductor region 205 and has a lower concentration than that of the two regions. Such a configuration having a buried channel can provide potential relationships as described in FIGS. 5A to 5F.

An N-type semiconductor region 208 constitutes part of the floating diffusion region 4 and is electrically connected to a gate of the amplifying transistor 12 which is an amplifying element via a plug 209.

A light shielding film 210 is provided so as to prevent incident light from entering the accumulating element. The light shielding film 210 is required to cover at least the accumulating element MEM, but as illustrated in FIG. 3, it is more preferable to extend over the entire first transfer electrode 207 and part of the second transfer electrode 204 enough to improve the light shielding capability.

An electric charge discharging control electrode 211 constitutes the third transfer switch 13 and can control the potential state of the third path between the photoelectric conversion element 2 and the OFD region 4. The electric charge discharging control electrode 211 is provided on the third path via an insulating film. The electric charge discharging control electrode 211 controls the potential state so as to be able to discharge the electric charge generated by incident light in the photoelectric conversion element 2 to the OFD. The accumulation period (exposure period) in the photoelectric conversion element 2 can be controlled by a voltage supplied to the electric charge discharging control electrode 211.

An N-type semiconductor region (first conductive fifth semiconductor region) 212 constitutes the OFD. A plug 215 is provided to supply a power source voltage to the fifth semiconductor region 212 and is connected to a power source (not illustrated). That is, a second power source is configured to include the fifth semiconductor region 212 and the plug 215.

The first transfer switch 8 constitutes a first transfer transistor together with the photoelectric conversion element 2 and the accumulating element MEM. The second transfer switch 9 constitutes a second transfer transistor together with the accumulating element MEM and the floating diffusion region 4. The third transfer switch 13 constitutes a third transfer transistor together with the photoelectric conversion element 2 and the second power source.

The imaging area 101 of the solid-state imaging apparatus is configured so as to arrange a plurality of unit pixels in a two-dimensional shape described in FIGS. 2 and 3. The pixel allows a plurality of photoelectric conversion elements to share the reset element, the amplifying element, the selection element and the like.

Now, the operation of the present embodiment will be described. FIG. 4 is a timing chart illustrating an operation of the solid-state imaging apparatus of the present embodiment. FIGS. 5A to 5F illustrate a potential state of a pixel at an individual timing from immediately before time t0 to the end of accumulation time, of the timings illustrated in FIG. 4. Here, an example is described where the transistor configured of the photodiode 2, the first transfer element 8 (TX1) and the accumulating element MEM is a buried channel transistor.

FIG. 4 illustrates a transition of signals TX1 to TX3 supplied to the respective control electrodes of the first to third transfer elements 8, 9 and 13 and a signal RES supplied to the control electrode of the reset transistor 10. The subscripts n, n+1 and n+2 each denote the respective row number in the imaging area 101. For example, TX1(n) denotes a signal supplied to the first transfer element 8 of a first row pixel.

Figure 5A:
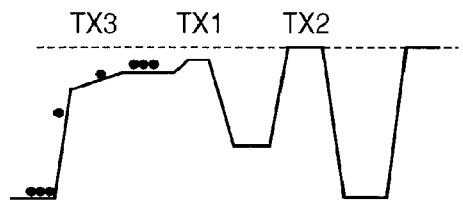
FIGS. 5A, 5B, 5C, 5D, 5E and 5F illustrate a potential state of a pixel.

First, in an initial state before time t0, the signals TX1(n) to TX1(n+2) and the signals TX2(n) to TX2(n+2) are at low level and the signals TX3(n) to TX3(n+2) and the signals RES(n) to RES(n+2) are at high level. The potential state of a pixel at this time is illustrated in FIG. 5A. During this period, there exists a potential barrier formed in the first transfer element 8 (TX1) against the electric charge accumulated in the accumulating element MEM. In contrast, there is no potential barrier in the third transfer element 13 (TX3). Therefore, the electric charge (black circles in the figure) generated in the photodiode (PD) 2 is not moved to the accumulating element MEM, but is discharged to the OFD via the third transfer element 13 (TX3). Here, the potential barrier formed in the first transfer element 8 (TX1) is lower than the potential barrier formed in the second transfer element 9 (TX2). The reason for this is that as described above, an example is considered where the transistor configured of the photodiode 2, the first transfer element 8 (TX1) and the accumulating element MEM is a buried channel transistor.

Figure 5D:
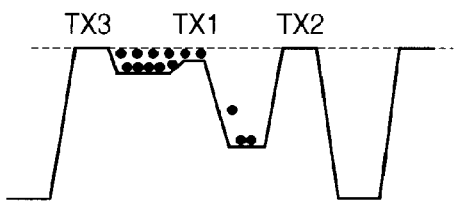
Figure 5B:
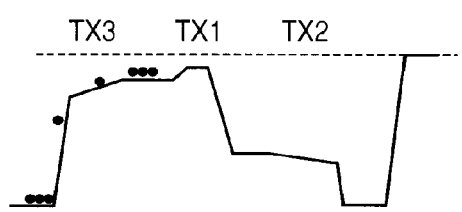

During the period from time t0 to time t1, the signals TX2(n) to TX2(n+2) enter high level and thus the potential barrier formed in the second transfer element 9 (TX2) between the accumulating element MEM and the FD region (FD) 4 disappears. Thereby, the electric charge held in the accumulating element before time t0 is transferred to the FD region 4. The potential state of the pixel in this period is illustrated in FIG. 5B. During this period, the signals TX1(n) to TX1(n+2) are at low level and the signals TX3(n) to TX3 (n+2) are at high level. Therefore, the electric charge generated in the photodiode 2 is discharged to the OFD via the third transfer element 13 (TX3). Accordingly, at this point of time, ideally, the electric charge generated in the photodiode 2 does not exist in the accumulating element MEM.

Figure 5E:
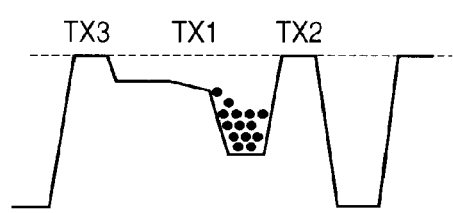
Figure 5C:
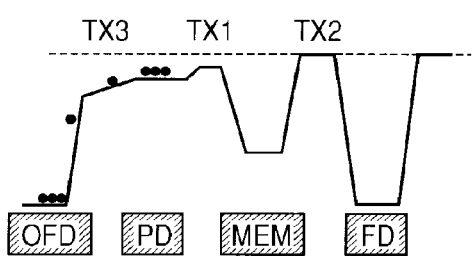

At time t1, the signals TX2(n) to TX2(n+2) enter low level. The potential state of the pixel at this time is illustrated in FIG. 5C. This potential state is the same as that of FIG. 5A. Also during this period, there exists a potential barrier formed in the first transfer element 8 (TX1) while there is no potential barrier in the third transfer element 13 (TX3). Therefore, the electric charge generated in the photodiode 2 is not moved to the accumulating element MEM, but is discharged to the OFD via the third transfer element 13 (TX3).

Next, at time t2, the signals TX3(n) to TX3(n+2) transition to low level. The potential state of the pixel at this time is illustrated in FIG. 5D. During this period, the potential barrier against the electric charge accumulated in the accumulating element MEM is such that the potential barrier of the third transfer element 13 (TX3) is higher than that of the first transfer element 8 (TX1). Since the signals TX2(n) to TX2 (n+2) are at low level, of the electric charge generated in the photodiode 2 during this period, the electric charge exceeding the potential barrier in TX1 stays in the photodiode 2 or the accumulating element MEM. Therefore, the time to accumulate each pixel starts at timing when at time t2, the signals TX3(n) to TX3(n+2) transition to low level.

Next, during the period from time t3 to time t4, the signals TX1(n) to TX1(n+2) enter high level. Then, the potential barrier formed in the first transfer element 8 disappears and the electric charge generated in the photodiode 2 is transferred to the accumulating element MEM (FIG. 5E). Subsequently, until time t5, the period when signals TX1(n) to TX1(n+2) enter low level and the period when signals TX1(n) to TX1(n+2) enter high level are repeated a plurality of times. The number of transfers is not particularly limited. For example, assume that the maximum saturation charge of the photodiode 2 is 500 electrons and the maximum saturation charge of the accumulating element MEM is 50,000 electrons. In this case, the highest effect can be obtained by setting the number of transfers to a ratio of the maximum saturation charge of the accumulating element MEM to the maximum saturation charge of the photodiode 2 or higher, that is 100 or more in this case. The adoption of such a driving method allows the electric charge accumulated in the photodiode 2 to be periodically transferred to the accumulating element MEM.

Here, as illustrated in FIG. 5D, the longer the state where the electric charge is accumulated in the photodiode 2, the longer the state where the potential of the photodiode 2 is low. Part of the light-excited electric charge tends to flow over a potential barrier formed between adjacent pixels and the substrate, increasing the rate at which a signal electric charge disappears. This causes cross talk or color mixture or PRNU to occur for the worse. In light of this, according to the present embodiment, the electric charge accumulated in the photodiode 2 is periodically transferred to the accumulating element MEM so as to maintain the potential of the photodiode 2 at a high level for a long period of time, thereby enabling the cross talk or color mixture or PRNU to be reduced.

Moreover, if the quantity of the electric charge accumulated in the photodiode 2 is small, the photodiode 2 quickly reaches a saturation state for the same amount of light. Therefore, in a state where the photodiode 2 is filled with the electric charge as illustrated in FIG. 5D, the state where the electric charge flowing over the potential barrier into the accumulating element MEM becomes longer and thus the problem with cross talk or color mixture or PRNU is further increased. In light of this, if the quantity of the electric charge accumulated in the photodiode 2 is small, the use of the present embodiment is more effective in reducing the cross talk or color mixture or PRNU. That is, in order to reduce the cross talk or color mixture or PRNU, the present embodiment of reducing the time of saturation of the photodiode 2 by forcibly repeating the transfer is more effective than other method of "letting" the electric charge flowing over the potential barrier flow from the photodiode 2 into the accumulating element MEM.

The smaller the size of a pixel, the shorter the distance between the pixels, the narrower the width of a region for isolation between the pixels and the lower the potential barrier between adjacent pixels. Then, the more remarkable the effect of the present embodiment is.

Figure 5F:
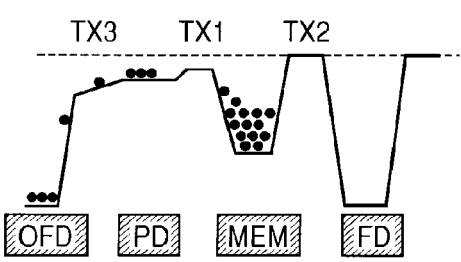

At time t5, the signals TX1(n) to TX1(n+2) transition to low level and in turn the signals TX3(n) to TX3(n+2) enter high level. The potential state of the pixel at this time is illustrated in FIG. 5F. After time t5, the electric charge generated in the photodiode 2 is discharged to the OFD via the third transfer element 13. Thus, the time to accumulate all pixels ends at time t5.

The start time and the end time to accumulate all pixels can be synchronized by transferring all pixels at the same time from the photodiode 2 to the accumulating element MEM. Thus, an intra-surface synchronized electronic shutter operation can be achieved.

Next, during the period from time t6 to time t8 when signal RES1(n) is at low level, the signal TX2(n) enters high level at time t6. Then, the electric charge held in the accumulating element MEM of each n-th row pixel is transferred to the FD region 4 via the second transfer element 9 (TX2). At least at this timing, the select transistor 11 is in the ON state and the source follower circuit formed of the amplifying transistor 12 and the constant current source causes a level corresponding to the amount of the electric charge transferred to the FD region to appear on the vertical signal line OUT. A signal corresponding to the level appearing on the vertical signal line OUT is output from the output circuit 104.

Likewise, a similar operation is performed on an n+1 row pixel and an n+2 row pixel and a signal corresponding to each of the respective row pixels is output from the output circuit 104. Thus, one frame of operation is completed.

Here, the present embodiment uses the OFD, but does not necessarily have to use the OFD. If the OFD is not available, every electric charge generated in the photodiode 2 can be transferred to the FD region 4 by causing the signals TX1(n) to TX1(n+2) and TX2(n) to TX2(n+2) to enter high level during the period from time t0 to time t1. The accumulating element MEM at this time can be made into a state where there is no electric charge like the state of FIG. 5B. Moreover, if outputting of a frame of signals is made to complete during the time after accumulation is completed at time t5 and before the electric charge generated in the photodiode 2 flows over the potential barrier into the accumulating element MEM, the time to accumulate all pixels can be determined at time t5 of FIG. 4 without using the OFD.

Thus, the use of the driving method of driving the imaging apparatus of the present embodiment can substantially reduce the time to accumulate the electric charge in the photodiode 2, thereby allowing excellent images having less cross talk or color mixture or photo response non-uniformity (PRNU) to be obtained.

Further, a reduction in transfer period per transfer during the photoelectric conversion period from the photodiode 2 to the accumulating element MEM enables a dark current to be greatly reduced, thereby allowing images having lower noise to be obtained. Specifically, in FIG. 4, the signals TX1(n) to TX1(n+2) each enter high level several times during the period from time t3 to time t5. For example, the time to be at high level once during the period from time t3 to time t4 is controlled to be a short time of 100 μs or less. A dark current occurring in the interface between a silicon oxide film and silicon of the MOS transistor of the first transfer element 8 is suppressed by shortening the time to deplete the surface.

Moreover, the more preferred time is 10 μs or less, thereby allowing excellent images less affected by the operating environment to be obtained.

Figure 10:
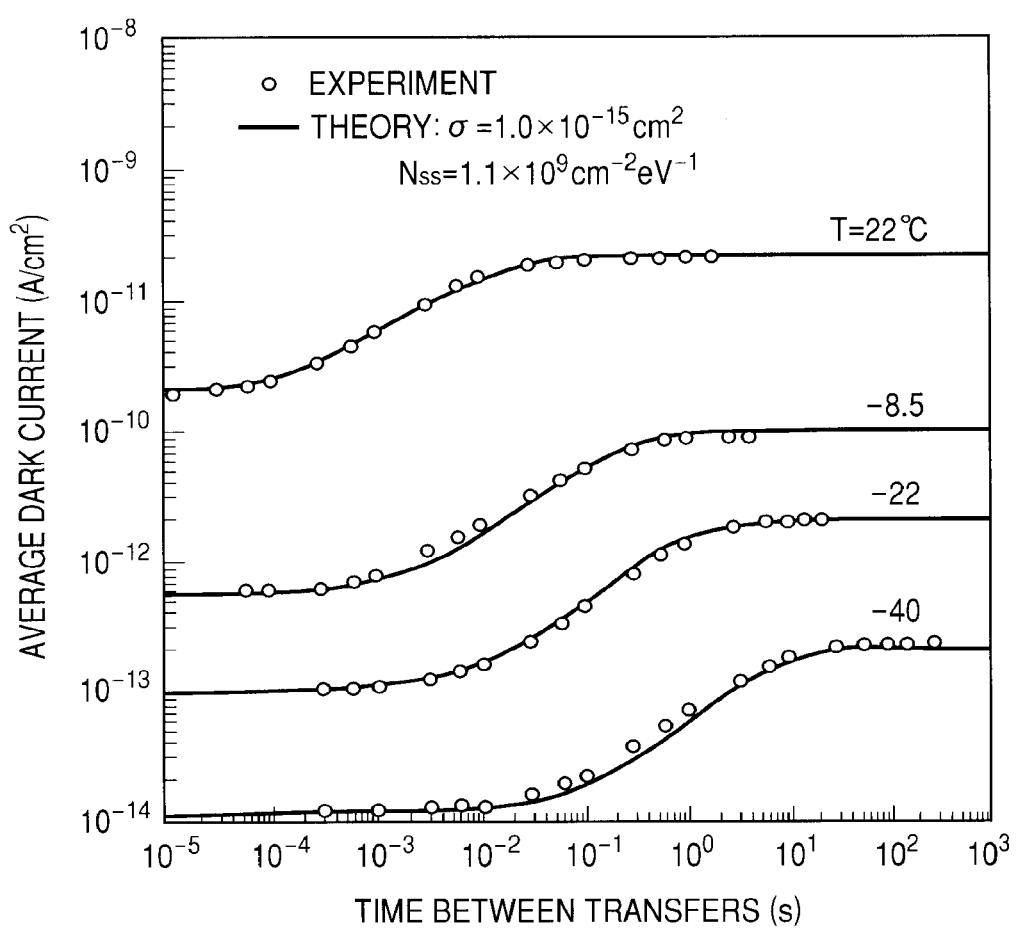
FIG. 10 is a graph illustrating a transfer period and an average dark current.

FIG. 10 is reproduced from aforementioned Non-Patent Document 1 revealing that the average dark current at transfer can be reduced by shortening the transfer period per transfer in a transfer channel of the buried channel CCD. In general, when the voltage of a transfer channel is changed from low level to high level, an electric charge is trapped in an interface state occurring in an interface oxide film of the transfer channel and the trapped electric charge is further exited to generate a dark current. Non-Patent Document 1 reveals that when the transfer period per transfer is shortened, the voltage of the transfer channel is returned to low level before the electric charge is exited to become a dark current, thus allowing the electric charge trapped in the interface state to be removed and thereby allowing the dark current to be reduced. Moreover, according to Non-Patent Document 1, the time from completion of a transfer to resumption of the transfer is theoretically 2 ns and practically 1 μs≤T≤3 μs is enough. This time is sufficiently short in comparison with the transfer period per transfer and thus can prevent the electric charge from leaking before the next transfer starts.

Note that FIG. 10 uses data about a buried channel transistor, but the surface generation and reconnection level density is not particularly changed for the surface channel transistor and thus in principle, there no difference in the degree of dark current occurring in a state where the surface is strongly inverted. Accordingly, the present data can be applied to the first transfer element 8 made of not only a buried channel transistor but also a surface channel transistor.

The present inventors have found that a phenomenon similar to the phenomenon disclosed in Non-Patent Document 1 occurred not in the transfer element of the CCD but in the first transfer element 8 located between the photodiode 2 and the accumulating element MEM of the solid-state imaging apparatus. Further, the present inventors have found a new driving method of driving the solid-state imaging apparatus expected to have a synergistic effect by adding this dark current reduction effect to the effect of reduction in cross talk or color mixture or photo response non-uniformity (PRNU) by reducing the saturation time of the photodiode 2.

Second Embodiment

Figure 6:
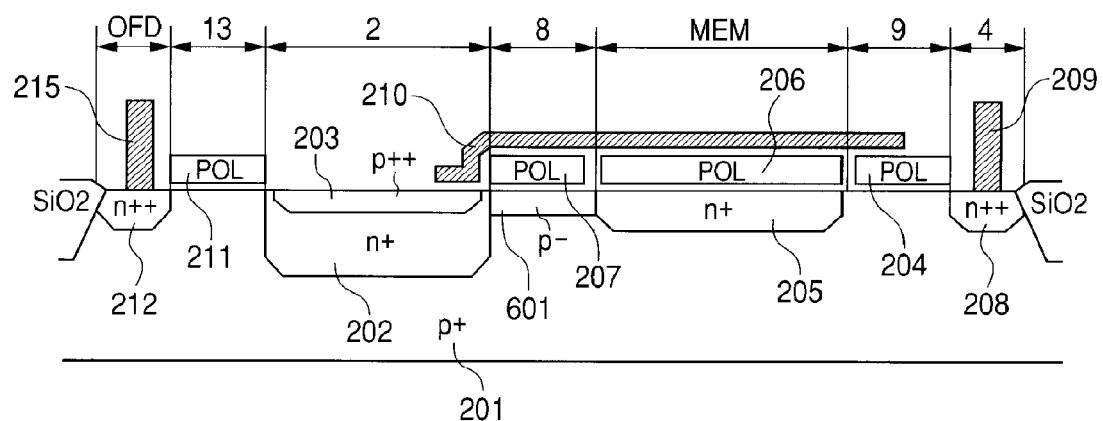
FIG. 6 is a sectional view illustrating a case where a pixel according to a second embodiment of the present invention is formed on a semiconductor substrate.

Hereinafter, the driving method of driving the solid-state imaging apparatus according to a second embodiment of the present invention will be described in detail by referring to the accompanying drawings. The second embodiment is the same as the first embodiment except that the first transfer element 8 is a surface channel transistor. FIG. 6 is a sectional view illustrating a case where a pixel according to the present embodiment is formed on a semiconductor substrate. FIG. 6 corresponds to FIG. 3 of the first embodiment. In FIG. 6, a P-type semiconductor region 601 may have the same impurity concentration as that of the P-type semiconductor region 201 or may have a different impurity concentration from that of the P-type semiconductor region 201.

FIGS. 8A to 8F illustrate a potential state of a pixel at an individual timing from immediately before time t0 to the end of accumulation time, of the timings illustrated in FIG. 4. The second embodiment of FIGS. 8A to 8F are different from the first embodiment of FIGS. 5A to 5F in that when the potential formed in the first transfer element 8 (TX1) is at low level, the potential is set the same level as the potential formed in the second transfer element 9 (TX2) or the potential formed in the third transfer element 13 (TX3). Since the first transfer element 8 (TX1) is a surface channel transistor, the first transfer element 8 (TX1) is configured such that the potential can be lowered as much as possible in order to prevent a dark current from occurring when the first transfer element 8 (TX1) is at low level. Therefore, in this case, it is preferable to control such that the electric charge does not overflow into the second transfer element 9 (TX2) as much as possible when the first transfer element 8 (TX1) is at low level.

Figure 8A:
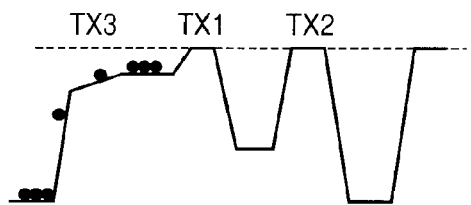
FIGS. 8A, 8B, 8C, 8D, 8E and 8F illustrate a potential state of a pixel.
Figure 8D:
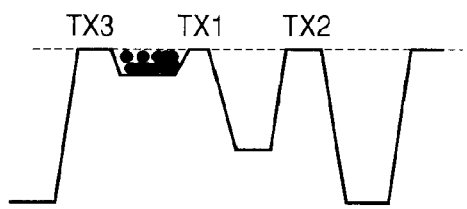
Figure 8B:
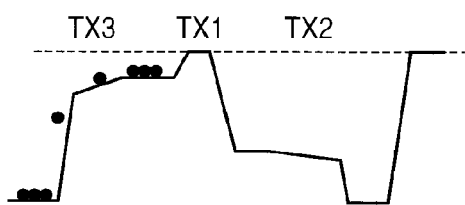
Figure 8E:
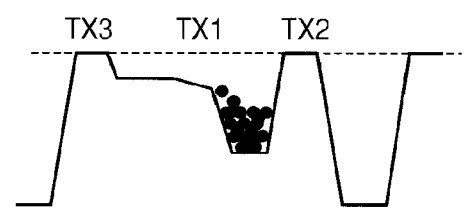
Figure 8C:
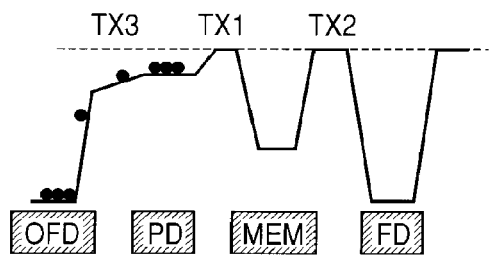
Figure 8F:
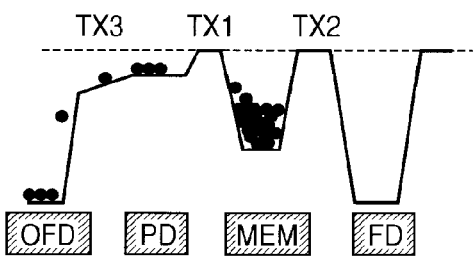

In exactly the same manner as in the first embodiment, the solid-state imaging apparatus is driven according to the timing chart of FIG. 4. When the signals TX1(n) to TX1(n+2) enter high level during the period from time t3 to time t4, the signals TX1(n) to TX1(n+2) enter high level, the potential barrier formed in the first transfer element 8 disappears and the electric charge generated in the photodiode 2 is transferred to the accumulating element MEM (FIG. 8E). Subsequently, until time t5, the period when signals TX1(n) to TX1(n+2) enter low level and the period when signals TX1(n) to TX1(n+2) enter high level are repeated a plurality of times. The adoption of such a driving method allows the electric charge accumulated in the photodiode 2 to be periodically transferred to the accumulating element MEM.

Even if the first transfer element 8 is a surface channel transistor, the electric charge accumulated in the photodiode 2 is periodically transferred to the accumulating element MEM so as to maintain the potential of the photodiode 2 at a high level for a long period of time, thereby enabling the cross talk or color mixture or PRNU to be reduced.

Meanwhile, in FIG. 6, the P-type semiconductor region 601 constituting the first transfer element 8 forms a surface channel. Therefore, the amount of transferred electric charge tends to be affected by the surface state and a dark current tends to increase. In light of this, the transfer period per transfer is set to 100 μs or less so as to further increase the effect of dark current reduction. The dark current reduction effect is added to the effect of reduction in cross talk or color mixture or photo response non-uniformity (PRNU) to be expected to have a great synergistic effect. It is more preferable to set the transfer period per transfer to 10 μs or less in order to obtain excellent images less affected by the operating environment.

Third Embodiment

Figure 7:
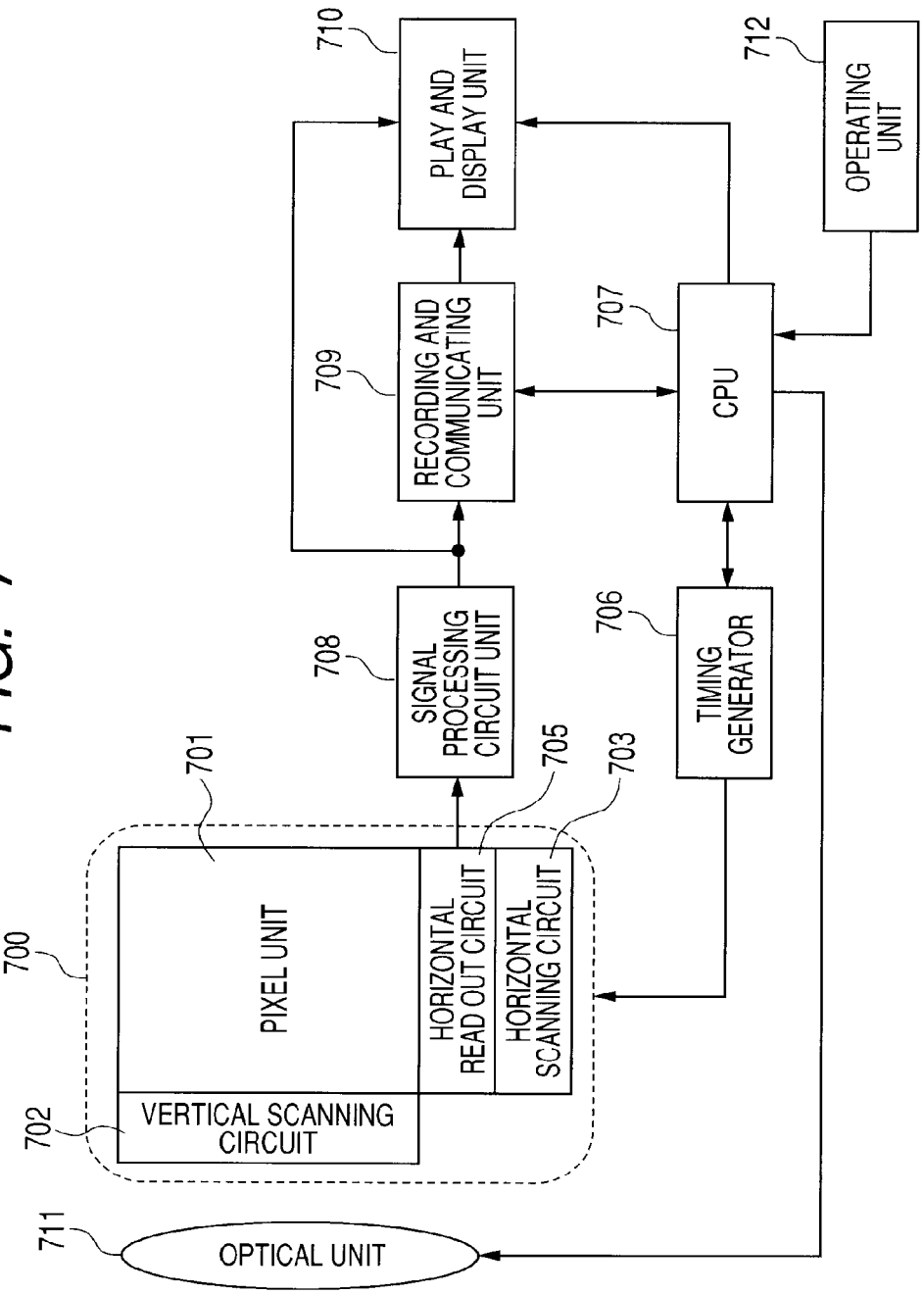
FIG. 7 illustrates a configuration example of an imaging system according to a third embodiment of the present invention.

FIG. 7 illustrates a configuration example of the solid-state imaging system according to a third embodiment of the present invention. The imaging system is an imaging system to which the solid-state imaging apparatus of the first embodiment or second embodiment is applied. For example, the imaging system includes an optical unit 711, a solid-state imaging apparatus 700, a signal processing circuit unit 708, a recording and communicating unit 709, a timing generator 706, a CPU 707, a play and display unit 710 and an operating unit 712.

The optical unit 711 which is an optical system such as a lens uses the pixel unit 701 which is located on the solid-state imaging apparatus 700 and has a plurality of pixels arranged in a two-dimensional shape so as to focus light from an object on the pixel unit 701 to form an object image. The pixel unit 701 includes the aforementioned imaging area 101. At a timing based on a signal from the timing generator 706, the solid-state imaging apparatus 700 outputs a signal according to the light focused on the pixel unit 701.

The solid-state imaging apparatus 700 includes a pixel unit 701 corresponding to the imaging area 101 of FIG. 1 and a horizontal read out circuit 705 having a retention unit which temporarily holds signals output to vertical signal lines from each pixel of the pixel unit 701. The horizontal read out circuit 705 may include an output unit corresponding to the output circuit 104 of FIG. 1. The solid-state imaging apparatus 700 further includes a vertical scanning circuit 702 which selects pixel rows of the pixel unit 701 and a horizontal scanning circuit 703 which controls so as to output a signal as a sensor signal output from the horizontal read out circuit 705.

The signals output from the solid-state imaging apparatus 700 are input to the signal processing circuit unit 708 which is a signal processing unit. The signal processing circuit unit 708 performs signal processing such as analog-digital (AD) conversion on the input electrical signals based on a method determined by programs and the like. The signals processed by the signal processing circuit unit 708 are sent as image data to the recording and communicating unit 709. The recording and communicating unit 709 sends the signals for forming images to the play and display unit 710 and instructs the play and display unit 710 to play and display moving images or still images. When signals are received from the signal processing circuit unit 708, the recording and communicating unit 709 not only communicates with the CPU 707 but also records the signals for forming images in a recording medium (not illustrated).

The CPU 707 integrally controls the operation of the imaging system and outputs control signals for controlling driving the optical unit 711, the timing generator 706, the recording and communicating unit 709 and the play and display unit 710. The CPU 707 further includes a storage device (not illustrated) which is a recording medium, in which programs and the like required to control the operation of the imaging system are stored. The CPU 707 outputs a driving mode instruction signal and an imaging instruction signal to the timing generator 706. Note that the driving mode instruction signal and the imaging instruction signal may not be different from each other, but may be the same signal.

When the driving mode instruction signal and the imaging instruction signal are received from the CPU 707, the timing generator 706 supplies signals to the vertical scanning circuit 702 and the horizontal scanning circuit 703 so as to cause the solid-state imaging apparatus 700 to operate in the driving mode according to the signals.

For example, the CPU 707 supplies the driving mode instruction signal and the imaging instruction signal to the timing generator 706 so as to perform imaging in the driving mode according to the intra-surface synchronized electronic shutter. In response to the signals, the timing generator 706 supplies the signals for performing the operation according to the intra-surface synchronized electronic shutter to the solid-state imaging apparatus 700. In response to the signals, the solid-state imaging apparatus 700 is driven, for example, at a timing illustrated in FIG. 4 to output a signal having the same accumulation time in the imaging area to the signal processing circuit unit 708.

The operating unit 712 is an interface which is operated by a user and outputs an operation signal according to the user operation to the CPU 707. More specifically, the imaging modes can be switched between the moving image modes and the still image modes and the shutter timing can be determined.

The play and display unit 710 is provided to display an input image data as an image and for example, can display the image data held in a recording medium (not illustrated) as the image via the recording and communicating unit 709. When the play and display unit 710 is used as an electronic view finder (EVF) described later, the image data supplied not from the recording and communicating unit 709 but directly from the signal processing circuit unit 708 can be displayed as the image.

According to the first to third embodiments, a dark current can be suppressed from occurring by transferring the electric charge a plurality of times from the photodiode 2 to the accumulating element MEM via the first transfer element 8 during the photoelectric conversion period. Moreover, cross talk or color mixture or photo response non-uniformity (PRNU) can be reduced by reducing the amount of electric charge accumulated in the photodiode 2 which is a photoelectric conversion element and intensifying the internal electric field of the photodiode 2.

The first and second solid-state imaging apparatuses each have a plurality of pixels 21. The pixel 21 includes a photoelectric conversion element 2 converting incident light to an electric charge; an accumulating element MEM accumulating the electric charge converted by the photoelectric conversion element 2; a first transfer element 8; and a second transfer element 9. The first transfer element 8 transfers the electric charge converted by the photoelectric conversion element 2 to the accumulating element MEM. The second transfer element 9 transfers the electric charge accumulated in the accumulating element MEM to the floating diffusion region 4. The amplifying element 12 amplifies the electric charge in the floating diffusion region 4. The first transfer element 8 transfers the electric charge converted by the photoelectric conversion element 2 to the accumulating element MEM a plurality of times and causes the electric charges transferred a plurality of times to be cumulatively accumulated in the accumulating element MEM.

The first transfer element 8 is such that during the non-transfer period (the period when the signal TX1 is at low level) between the plurality of times of transfers, the potential barrier thereof is the lowest of the elements adjacent to the photoelectric conversion element 2. The first transfer element 8 and the third transfer element 13 are elements adjacent to the photoelectric conversion element 2. As illustrated in FIG. 5D, the first transfer element 8 (TX1) has a potential barrier lower than that of the third transfer element 13 (TX3).

It is preferable that the transfer period per transfer is 100 μs or less when the first transfer element transfers the electric charge from the photoelectric conversion element 2 to the accumulating element MEM. It is preferable that the maximum amount of electric charge accumulated in the photoelectric conversion element 2 is smaller than the maximum amount of electric charge accumulated in the accumulating element MEM.

The imaging system of the third embodiment includes a solid-state imaging apparatus 700 of the first or second embodiment; an optical unit 711 for focusing an light image on the solid-state imaging apparatus 700; and a signal processing unit 708 for processing signals output by the solid-state imaging apparatus 700.

According to the first to third embodiments, a dark current can be suppressed from occurring by causing the first transfer element 8 to transfer the electric charge a plurality of times. Moreover, cross talk or color mixture or photo response non-uniformity (PRNU) can be reduced by reducing the amount of electric charge accumulated in the photoelectric conversion element 2 and intensifying the internal electric field of the photoelectric conversion element 2.

It should be noted that the above embodiments each illustrate just an example of reduction to practice for implementing the present invention and the technical scope of the present invention should not be restrictively interpreted by these embodiments. That is, the present invention can be implemented in various forms without departing from the technical ideas or the major characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-334917, filed Dec. 26, 2008, which is hereby incorporated by reference herein in its entirety.

What is claimed is:

1. A solid-state imaging apparatus comprising a plurality of pixels, wherein each of the pixels includes:
   a photoelectric conversion element for converting an incident light into an electric charge;
   an accumulating element having a semiconductor region for accumulating the electric charge converted by the photoelectric conversion element;
   a first transfer element for transferring the electric charge converted by the photoelectric conversion element to the semiconductor region;
   a second transfer element for transferring the electric charge accumulated in the semiconductor region to a floating diffusion region;
   an amplifying element for amplifying a signal corresponding to the electric charge in the floating diffusion region; and
   a reset element for resetting an electric potential of the floating diffusion region, wherein
   under a condition of an OFF state of the second transfer element and without resetting the floating diffusion region, a plural times of operations to switch the first transfer element from an OFF state to an ON state, and
   the accumulating element collectively accumulates the electric charge transferred by the plural times of operations to switch.

2. The solid-state imaging apparatus according to claim 1, wherein each pixel has a potential profile such that, during a period between the plural times of transferring by the first transfer element, a potential barrier between the first transfer element and the photoelectric conversion element is lower than all a potential barrier between any one of the accumulating element, the first transfer element, the second transfer element, the amplifying element or reset element, and the photoelectric conversion element.

3. The solid-state imaging apparatus according to claim 1, wherein a period T of a single time of transferring by the first transfer element is 100 μsec or shorter.

4. The solid-state imaging apparatus according to claim 1, wherein a period T of a single time of transferring by the first transfer element is 10 μsec or shorter.

5. The solid-state imaging apparatus according to claim 1, wherein a period T of a single time of transferring by the first transfer element is in a range of 1 μsec<T<3 μsec.

6. The solid-state imaging apparatus according to claim 1, wherein a maximum quantity of the electric charge accumulated in the photoelectric conversion element is smaller than a maximum quantity of the electric charge accumulated in the accumulating element.

7. The solid-state imaging apparatus according to claim 1, wherein the solid-state imaging apparatus is incorporated in an imaging system that includes:
   an optical unit for focusing an optical image onto the imaging apparatus; and
   a signal processing unit for processing a signal outputted from the optical unit.

8. The solid-state imaging apparatus according to claim 1, wherein, for the turning ON at the plurality of times the first transfer element, pulses are supplied simultaneously to the first transfer elements in a plurality of rows.

9. A driving method of a solid-state imaging apparatus that includes a plurality of pixels arranged in a matrix, wherein each of the pixels includes:
   a photoelectric conversion element for converting an incident light into an electric charge;
   an accumulating element having a semiconductor region for accumulating the electric charge converted by the photoelectric conversion element;
   a first transfer element for transferring the electric charge converted by the photoelectric conversion element to the semiconductor region;
   a second transfer element for transferring the electric charge accumulated in the semiconductor region to a floating diffusion region; and
   an amplifying element for amplifying a signal corresponding to the electric charge in the floating diffusion region, the method comprising:

a first transferring step, for transferring the electric charge converted by the photoelectric conversion element to the accumulating element, by performing a plural times of operations to switch the first transfer element from an OFF state to an ON state without resetting the floating diffusion region, under a condition of an OFF state of the second transfer element;

an accumulating step for collectively accumulating, by the accumulating element, the electric charge transferred by first transferring step; and a second transferring step for transferring the electric charge accumulated in the accumulating step to the floating diffusion region row by row successively by the second transfer element.

* * * * *